(12) United States Patent
Jiang et al.

(10) Patent No.: US 10,725,938 B2
(45) Date of Patent: Jul. 28, 2020

(54) VOLTAGE REGULATOR AND ASSOCIATED AUTO-LOOP REGULATION SYSTEM AND METHOD

(71) Applicant: Chengdu Monolithic Power Systems Co., Ltd., Chengdu (CN)

(72) Inventors: Lijie Jiang, Hangzhou (CN); Xiaokang Wu, Hangzhou (CN); Suhua Luo, Hangzhou (CN); Qian Ouyang, Hangzhou (CN)

(73) Assignee: Monolithic Power Systems, Inc., San Jose (CN)

( * ) Notice: Subject to any disclaimer, the term of this patent is extended or adjusted under 35 U.S.C. 154(b) by 1 day.

(21) Appl. No.: 16/174,213

(22) Filed: Oct. 29, 2018

(65) Prior Publication Data
US 2019/0129868 A1 May 2, 2019

(30) Foreign Application Priority Data
Oct. 30, 2017 (CN) .......................... 2017 1 1036796

(51) Int. Cl.
| | |
|---|---|
| G06F 13/10 | (2006.01) |
| G05F 1/10 | (2006.01) |
| H02M 3/04 | (2006.01) |
| H02M 1/00 | (2006.01) |
| H02M 3/158 | (2006.01) |

(52) U.S. Cl.
CPC .............. G06F 13/10 (2013.01); G05F 1/10 (2013.01); H02M 3/04 (2013.01); G05B 2219/25401 (2013.01); G06F 2213/40 (2013.01); H02M 3/158 (2013.01); H02M 2001/0025 (2013.01)

(58) Field of Classification Search
CPC ... G06F 13/10; G05F 1/10; H02M 2001/0025
See application file for complete search history.

(56) References Cited

U.S. PATENT DOCUMENTS

| | | | |
|---|---|---|---|
| 9,041,373 B2 | 5/2015 | Jiang | |
| 9,356,510 B2 | 5/2016 | Jiang | |
| 2009/0195224 A1* | 8/2009 | Kim | .......................... H02P 9/02 |
| | | | 322/28 |
| 2010/0181983 A1* | 7/2010 | Ouyang | ................ H02M 3/156 |
| | | | 323/283 |
| 2011/0234000 A1* | 9/2011 | Yan | ........................ H02M 3/157 |
| | | | 307/31 |

* cited by examiner

*Primary Examiner* — Zachary K Huson
(74) *Attorney, Agent, or Firm* — Perkins Coie LLP

(57) ABSTRACT

An auto-loop regulation system for a voltage regulator receives a plurality of pre-determined loop parameters through an interactive computing equipment, and the voltage regulator operates according to the plurality of pre-determined loop parameters, wherein the interactive computing equipment regulates at least one of the loop parameters automatically in real time according to an online loop value when the voltage regulator is operating online, and the interactive computing equipment keeps regulating the loop parameters until the online value of the voltage regulator matches with a target value.

17 Claims, 9 Drawing Sheets

VOLTAGE REGULATOR AND ASSOCIATED AUTO-LOOP REGULATION SYSTEM AND METHOD

This application claims the benefit of CN application No. 201711036796.6, filed on Oct. 30, 2017, and incorporated herein by reference.

TECHNICAL FIELD

The present invention relates to electrical circuit, more particularly but not exclusively relates to a voltage regulator and associated auto-loop regulation system and method.

BACKGROUND

Voltage regulators are popularly used in electronic equipments to provide stable voltages. It's important to optimize the voltage regulator with fast dynamic response, precise voltage and high efficiency. Traditionally, engineers need to design parameters of the control loops of the voltage regulator meticulously by handwork to satisfy the requirements. However, this will cost a lot of time and manpower.

SUMMARY

It is one of the objects of the present invention to provide a voltage regulator and associated auto-loop regulation system and method.

One embodiment of the present invention discloses an auto-loop regulation method for a voltage regulator, comprising: step a: receiving a plurality of pre-determined loop parameters which are used for the voltage regulator via an interactive computing equipment; step b: operating the voltage regulator according to the plurality of pre-determined loop parameters; step c: reading an online loop value of the voltage regulator through the interactive computing equipment when the voltage regulator is operating online; step d: regulating at least one of the loop parameters in real time automatically according to the online loop value of the voltage regulator; step e: operating the voltage regulator according to the regulated loop parameters; and step f: repeating step c, step d and step e until the online loop value of the voltage regulator matches with a target loop value.

Another embodiment of the present invention discloses an auto-loop regulation system for a voltage regulator, wherein the voltage regulator is configured to receive an input voltage and to provide and output voltage, comprising: an interactive computing equipment, configured to receive a plurality of pre-determined loop parameters which are used for the voltage regulator, and the interactive computing equipment is configured to regulate at least one of the loop parameters in real time automatically according to an online loop value of the voltage regulator when the voltage regulator is operating online; and a communication bus, coupled between the interactive computing equipment and the voltage regulator, and is configured to realize a real-time communication between the interactive computing equipment and the voltage regulator.

Yet another embodiment of the present invention discloses a voltage regulator, comprising: an interface circuit, coupled to an interactive computing equipment through a communication bus; a memory, configured to store a plurality of loop parameters provided by the interactive computing equipment; a voltage regulation circuit, configured to receive an input voltage and provide an regulated output voltage; and a control loop, configured to receive the plurality of loop parameters provided by the interactive computing equipment, and according to the plurality of loop parameters, the control loop is configured to control the voltage regulator to operate online, and when the voltage regulator is operating online, the control loop is configured to provide an online loop value of the voltage regulator; wherein the voltage regulator is configured to output the online loop value to the interactive computing equipment by the interface circuit, and the voltage regulator is configured to keep regulating the loop parameters according to the online loop value in real time until the online loop value matches with a target loop value.

According to the embodiments of the present invention, the voltage regulator and associated auto-loop regulation system and method can optimize the loop parameters automatically in real time, which saves a mass of time and manpower.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are described to provide a thorough understanding of the present invention, such as examples of circuits, components, and methods. These embodiments illustrated are exemplary, not to confine the scope of the invention. A person with ordinary skill in the art will recognize, however, that the invention can be implemented without one or more of the specific details. In other instances, well-known details are not shown or described to avoid obscuring the aspects of the invention. Some phrases are used in some exemplary embodiments. However, the usage of these phrases is not confined to these embodiments.

In the present application, according to an online loop value in a voltage regulator, the auto-loop regulation system can regulate at least one of the loop parameters in real time automatically via an interactive computing equipment until the online loop value matches with the target loop value. The voltage regulator and associated auto-loop regulation system and method can optimize the loop parameters automatically, which saves a mass of time and manpower.

Figure 1:
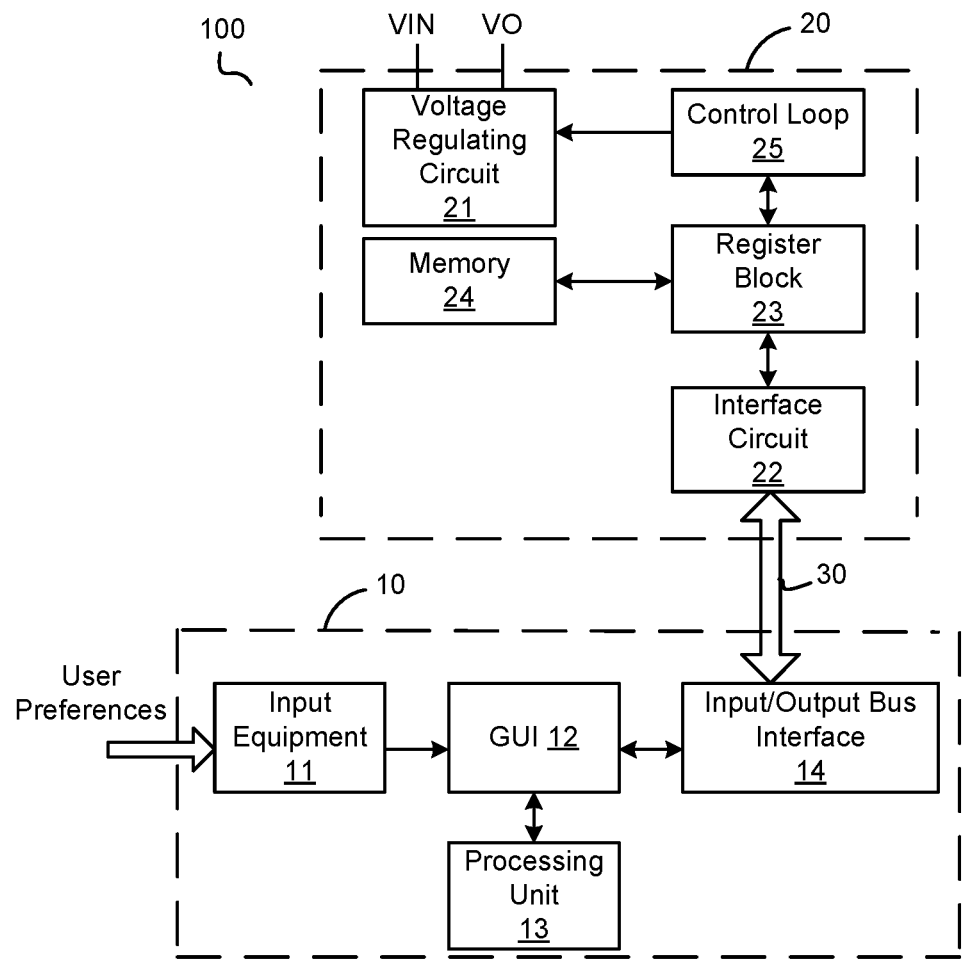
FIG. 1 schematically illustrates an auto-loop regulation system 100 according to an embodiment of the present invention.

FIG. 1 schematically illustrates an auto-loop regulation system 100 according to an embodiment of the present invention. The auto-loop regulation system 100 comprises an interactive computing equipment 10, a voltage regulator 20 and a communication bus 30. The auto-loop regulation system 100 is configured to receive user preferences, e.g. loop parameters of the voltage regulator 20, and is configured to regulate at least one of the loop parameters according to an online loop value of the voltage regulator 20 when the voltage regulator 20 is operating online. The voltage regulator 20 is configured to receive an input voltage VIN and provide an output voltage VO. The communication bus 30 is coupled between the interactive computing equipment 10 and the voltage regulator 20 in order to realize a real time communication between the interactive computing equipment 10 and the voltage regulator 20. Wherein the communication bus 30 comprises e.g. an I2C (Inter-Integrated Circuit) serial bus, a power management bus (PMbus), a system management bus (SMBus) and so on. In one embodiment, the interactive computing equipment 10 is configured to read the online loop value via the communication bus 30 when the voltage regulator 20 is operating online, and is configured to keep regulating at least one of the loop parameters according to the online loop value and a target loop value until the online loop value of the voltage regulator 20 matches with the target loop value. In one embodiment, the target loop value is configured to be pre-determined through the interactive computing equipment 10. In another embodiment, the target loop value is configured to be set by the interactive computing equipment 10 according to the online loop value of the voltage regulator 20. The online loop value of the voltage regulator 20 matching with the target loop value comprises e.g. that the online loop value is configured to be equal to the target loop value. In one embodiment, the online loop value matching with the target loop value comprises e.g. that a difference between the online loop value and the target loop value is configured to be within a certain margin of error.

In the embodiment illustrated in FIG. 1, the interactive computing equipment 10 comprises an input equipment 11, a GUI (Graphical User Interface) 12, a processing unit 13 and an input and output bus interface 14. The interactive computing equipment 10 can be e.g. a desktop computer, a laptop computer and so on. The input equipment 11 is configured to receive user preferences. The input equipment 11 can be e.g. keyboard, mouse, touch screen and so on. The user preferences can comprise e.g. the target loop value, the plurality of loop parameters, operating modes of the voltage regulator 20 and so on. The GUI 12 is configured to provide a user interface in a visual way, and is configured to e.g. show the user preferences through the input equipment 11, wherein the user preferences are configured to be pre-determined. The GUI 12 is also configured to e.g. show operating results like the online loop value, online loop parameters, online operating modes, and online circuit parameters and so on. The processing unit 13 is configured to carry out preset computer readable program codes and regulate at least one of the loop parameters in real time according to the online loop value of the voltage regulator 20. In one embodiment, the preset computer readable program codes e.g. comprise loop parameters calculation program codes which are set according to a knowledge base of the voltage regulator 20 of different operating modes. The input and output bus interface 14 is coupled to the voltage regulator 20 via the communication bus 30. In one embodiment, the input and output bus interface 14 comprises a USB (Universal Serial Bus) interface. The interactive computing equipment 10 is configured to read the online operating results of the voltage regulator 20 and write the user preferences received by the GUI 12 into the voltage regulator 20, and is configured to regulate at least one of the loop parameters of the voltage regulator 20 according to execution results of the computer readable program codes.

In the embodiment illustrated in FIG. 1, the voltage regulator 20 comprises a voltage regulation circuit 21, an interface circuit 22, a register block 23, a memory 24 and a control loop 25. In one embodiment, the voltage regulator is configured to be an integrated circuit. The voltage regulation circuit 21 is configured to receive the input voltage VIN and provide a regulated output voltage VO under the control of the control loop 25. The interface circuit 22 is coupled to the interactive computing equipment 10 via the communication bus 30. In one embodiment, the interface circuit 22 is configured to transform the communication bus 30 to a bus which is compatible with the voltage regulator 20, for instance, transforming the USB interface to the PMBus in the voltage regulator 20. The register block 23 comprises a plurality of registers configured to store temporary orders, data and addresses. The memory 24 is configured to store the user preferences provided by the interactive computing equipment 10 temporarily or permanently, e.g. loop parameters. In one embodiment, the memory 24 comprises RAM (Random Access Memory) and ROM (Read Only Memory). The control loop 25 is configured to control the operation of the voltage regulation circuit 21 according to the loop parameters stored in the memory 24 or the loop parameters provided by the interactive computing equipment 10.

Figure 2:
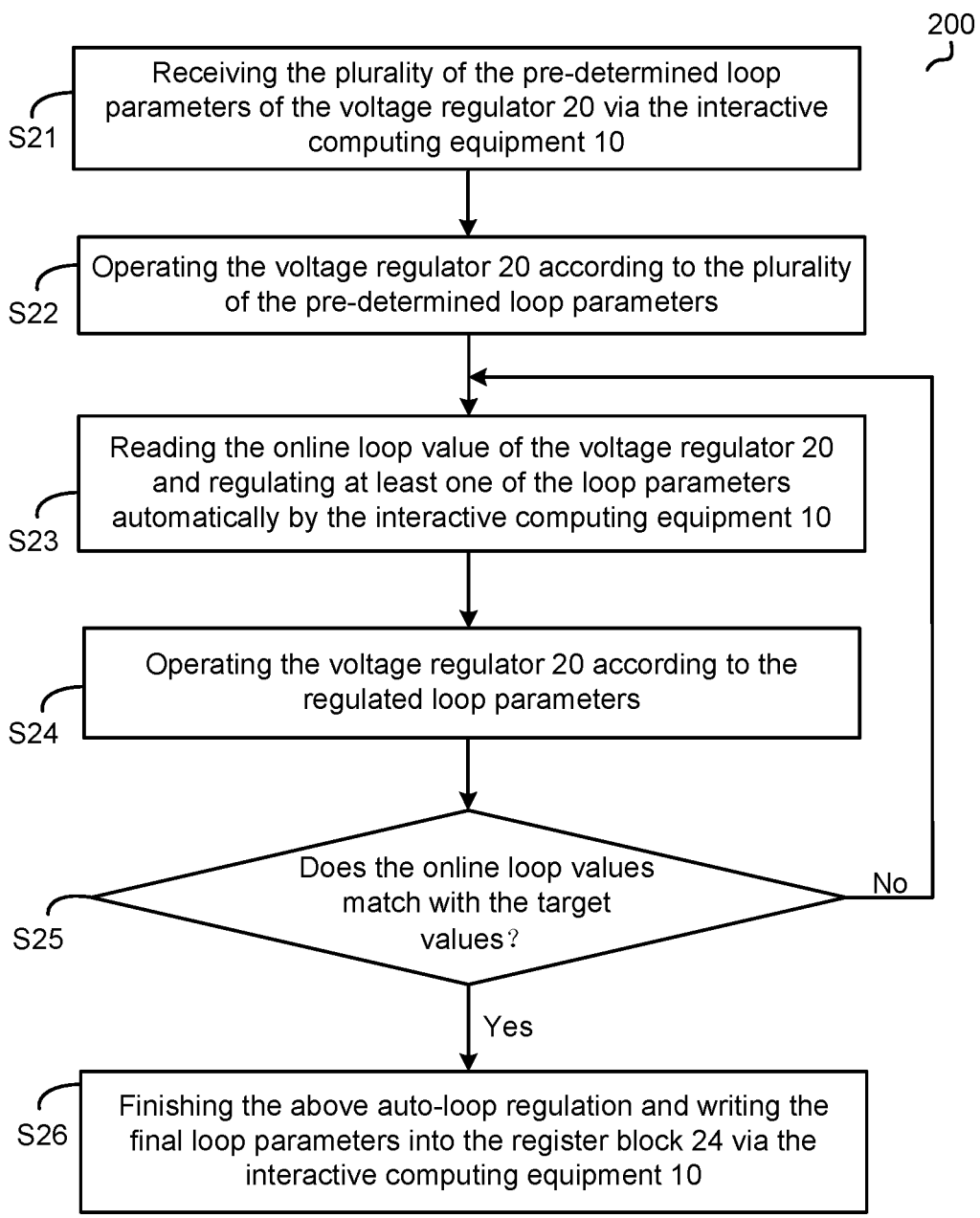
FIG. 2 shows a flow chart of an auto-loop regulation method 200 according to an embodiment of the present invention.

FIG. 2 shows a flow chart of an auto-loop regulation method 200 according to an embodiment of the present invention. The method comprises steps S21-S26.

At the step S21, receiving the plurality of the pre-determined loop parameters of the voltage regulator 20 via the interactive computing equipment 10.

At the step S22, operating the voltage regulator 20 according to the plurality of the pre-determined loop parameters.

At the step S23, reading the online loop value of the voltage regulator 20 and regulating at least one of the loop parameters automatically by the interactive computing equipment 10.

At the step S24, operating the voltage regulator 20 according to the regulated loop parameters.

At the step S25, entering into the step S26 if the online loop value of the voltage regulator 20 matches with the target loop value, or else, repeating the steps S23-S24.

At the step S26, finishing the above auto-loop regulation and writing the final loop parameters into the register block 24 via the interactive computing equipment 10.

Figure 3:
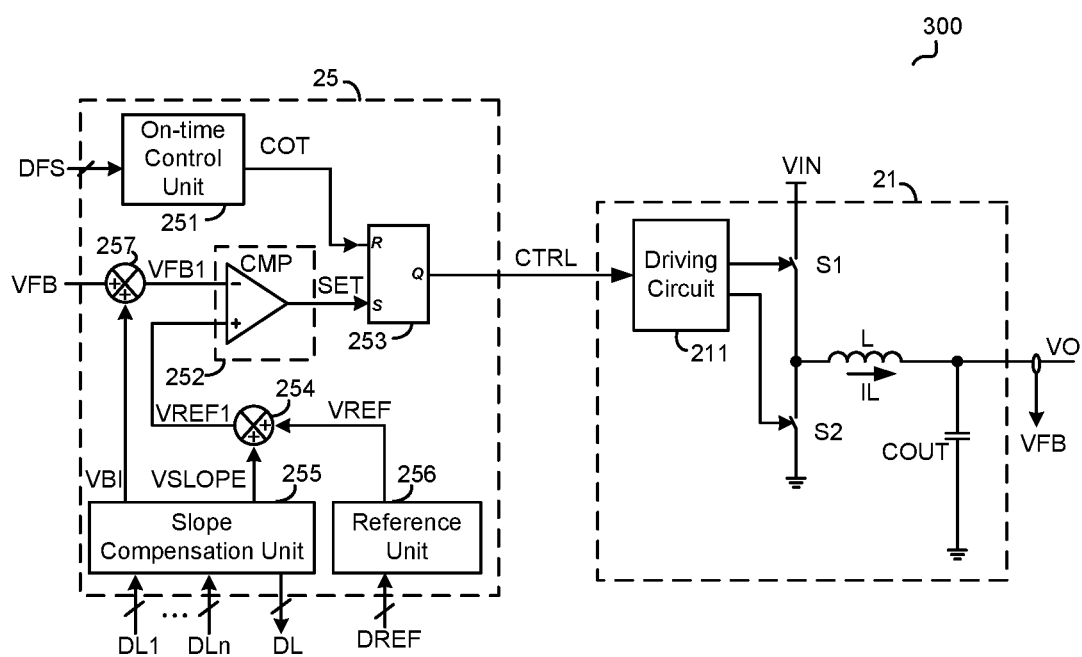
FIG. 3 schematically illustrates a circuit block 300 of a voltage regulation circuit 21 and a control loop 25 according to an embodiment of the present invention.

FIG. 3 schematically illustrates a circuit block 300 of the voltage regulation circuit 21 and the control loop 25 according to an embodiment of the present invention. A person with ordinary skill in the art should know that the voltage regulation circuit 21 and the control loop 25 illustrated in FIG. 3 are exemplary, not to confine the scope of the invention. In the embodiment illustrated in FIG. 3, a step-down dc converter is as an example to illustrate the voltage regulation circuit 21. A person with ordinary skill in the art will recognize that the voltage regulation circuit 21 can be other kinds of voltage converters.

In the embodiment illustrated in FIG. 3, the voltage regulation circuit 21 comprises a first switch S1, a second switch S2, an inductance L and an output capacitor COUT. The voltage regulation circuit 21 is configured to convert the input voltage VIN to the output voltage VO by controlling the first switch S1 and the second switch S2 to be turned on and off. The first switch S1 comprises a first terminal, a second terminal and a control terminal, wherein the first terminal of the first switch S1 is configured to receive the input voltage VIN. The second switch S2 comprises a first terminal, a second terminal and a control terminal, wherein the first terminal of the second switch S2 is coupled to the second terminal of the first switch S1, and the second terminal of the second switch S2 is coupled to a ground terminal. The inductance L comprises a first terminal and a second terminal, wherein the first terminal of the inductance L is coupled to the second terminal of the first switch S1 and the first terminal of the second switch S2. The output capacitor COUT is coupled between the second terminal of the inductance L and the ground terminal. Wherein a voltage across the output capacitor COUT is configured to be the output voltage VO. In another embodiment, the second switch S2 can be replaced by a diode. In one embodiment, the voltage regulation circuit 21 also comprises a driving circuit 211, wherein the driving circuit 211 is configured to control the first switch S1 and the second switch S2 to be turned on and off respectively according to a control signal CTRL provided by the control loop 25. In one embodiment, the voltage regulation circuit 21 also comprises a feedback circuit configured to provide a feedback signal VFB according to the output voltage VO.

In one embodiment, the control loop 25 is configured to receive loop parameters DL1-DLn provided by the interactive computing equipment 10 to control the operation of the voltage regulator 20, and is configured to provide an online loop value DL of the voltage regulator 20, then the interactive computing equipment 10 is configured to regulate a at least one of the loop parameters automatically according to the online loop value DL, e.g. regulating one or more of the loop parameters DL1-DLn. It is configured to repeat the process "the control loop 25 is configured to receive loop parameters DL1-DLn provided by the interactive computing equipment 10 to control the operation of the voltage regulator 20, and is configured to provide an online loop value DL of the voltage regulator 20, then the interactive computing equipment 10 is configured to regulate a at least one of the loop parameters automatically according to the online loop value DL, e.g. regulating one or more of the loop parameters DL1-DLn" until the online loop value DL matches with the target loop value.

In the embodiment illustrated in FIG. 3, the control loop 25 comprises a slope compensation unit 255. The slope compensation unit 255 is configured to receive the loop parameters DL1-DLn, and is configured to provide a slope compensation signal VSLOPE and a bias signal VBI according to the loop parameters DL1-DLn, wherein n is a natural number greater than 1. In one embodiment, when the interactive computing equipment 10 is configured to regulate at least one of the loop parameters, and the slope compensation signal VSLOPE or the bias signal VBI is configured to be adjusted therewith.

In the embodiment illustrated in FIG. 3, the control loop 25 also comprises an on-time control unit 251, a comparator unit 252, a logic unit 253 and a reference unit 256. In other embodiments, the control loop can also comprise a protection unit, a Digital-to-Analog Converter (DAC), an Analog-to-Digital Converter (ADC), and so on.

The on-time control unit 251 is configured to produce an on-time control signal COT according to a frequency control signal DFS, wherein the on-time control signal COT is configured to control an on-time of the first switch S1, thus controlling a switching period Ts of the voltage regulation circuit 21 when it's operating at a steady state. The frequency control signal DFS can e.g. be pre-determined through the interactive computing equipment 10. The reference unit 256 is configured to produce a reference signal VREF according to a reference control signal DREF in order to control a magnitude of the output voltage VO. The reference control signal DREF can e.g. be pre-determined through the interactive computing equipment 10. The comparator unit 252 is configured to provide a comparison signal SET according to the voltage feedback signal VFB, the bias signal VBI, the slope compensation signal VSLOPE and the reference signal VREF. In the embodiment illustrated in FIG. 3, the comparator unit 252 comprises a first input terminal, a second input terminal and an output terminal, wherein the first input terminal is configured to receive a signal (VFB+VBI) which is a sum of the voltage feedback signal VFB and the bias signal VBI, the second input terminal is configured to receive a signal (VREF+VSLOPE) which is a sum of the reference signal VREF and the slope compensation signal VSLOPE, and the output terminal is configured to provide the comparison signal SET. In the embodiment illustrated in FIG. 3, the control loop 25 is configured to provide the signal (VREF+VSLOPE) via a calculation unit 254, and is configured to provide the signal (VFB+VBI) via a calculation unit 257. The calculation unit 254 comprises a first input terminal, a second input terminal and an output terminal, wherein the first terminal is coupled to the slope compensation unit 255 to receive the slope compensation signal VSLOPE, the second input terminal is configured to receive the reference signal VREF, and the output terminal is configured to provide a corrected reference signal VREF1 for the comparator unit 252 according to the signal (VSLOPE+VREF). The calculation unit 257 comprises a first input terminal, a second input terminal and an output terminal, wherein the first input terminal is coupled to the slope compensation unit 255 to receive the bias signal VBI, the second input terminal is configured to receive the voltage feedback signal VFB, and the output terminal is configured to provide a corrected feedback signal VFB1 for the comparator unit 252 according to the signal (VFB+VBI). The logic unit 253 comprises a first input terminal, a second input terminal and an output terminal, wherein the first input terminal is coupled to the on-time control unit 251 to receive the on-time control signal COT, the second input terminal is coupled to the comparator unit 252 to receive the comparison signal SET, and the output terminal is configured to produce the control signal CTRL according to the on-time control signal COT and the comparison signal SET. In one embodiment, the logic unit 253 is configured to set the control signal CTRL by the control of the comparison signal SET, thus controlling the on-time of the first switch S1. If the signal (VFB+VBI) is less than the signal (VSLOPE+VREF), the first switch S1 is configured to be turned on by the control of the control signal CTRL. In one embodiment, the logic unit 253 is configured to reset the control signal CTRL by the control of the on-time control signal COT, thus controlling the on-time of the first switch S1, i.e. controlling an off moment of the first switch S1.

In other embodiments, the control loop 25 can also comprise a protection unit, a Digital-to-Analog Converter (DAC), an Analog-to-Digital Converter (ADC), and so on.

Figure 4:
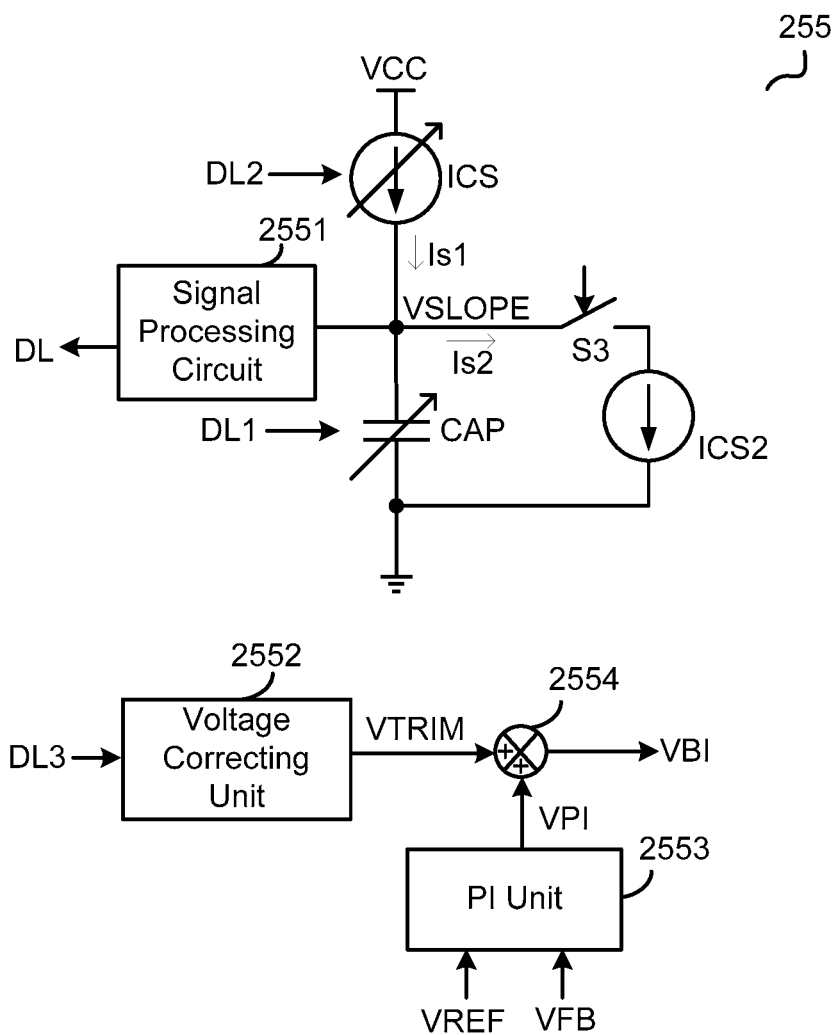
FIG. 4 schematically illustrates a slope compensation unit 255 according to an embodiment of the present invention.

FIG. 4 schematically illustrates a slope compensation unit 255 according to an embodiment of the present invention. A person with ordinary skill in the art should know that the slope compensation unit 255 illustrated in FIG. 4 is exemplary, not to confine the scope of the invention, the slope compensation unit 255 can be other kinds of circuits.

In the embodiment illustrated in FIG. 4, the slope compensation unit 255 comprises a charging current source ICS, a slope producing capacitor CAP, a discharging current source ICS2 and a signal processing circuit 2551. One terminal of the charging current source ICS is coupled to a power source VCC, the other terminal of the charging current source ICS is configured to provide a charging current Is1, wherein the charging current Is1 is configured to charge the slope producing capacitor CAP. One terminal of the slope producing capacitor CAP is coupled to the charging current source ICS, the other terminal of the slope producing capacitor CAP is coupled to the ground terminal. A voltage across the slope producing capacitor CAP is configured to be the slope compensation signal VSLOPE. In the embodiment illustrated in FIG. 4, the loop parameter DL1 comprises a target capacitance of the slope producing capacitor, wherein the target capacitance is configured to regulate the capacitance of the slope producing capacitor in the voltage regulator 20. The loop parameter DL2 comprises a target value of the charging current, wherein the target value of the charging current is configured to regulate a magnitude of the charging current Is1 provided by the charging current source ICS in the voltage regulator 20. The online loop value DL comprises the amplitude of the slope compensation signal VSLOPE, wherein the slope compensation signal VSLOPE is configured to be produced by the voltage regulator 20 online according to the loop parameters DL1-DL2. In one embodiment, the slope compensation unit 255 is configured to control the charging current source ICS according to the loop parameter DL2, thus controlling the amplitude of the charging current Is1. In one embodiment, the slope compensation unit 255 is configured to control the capacitance of the slope producing capacitor CAP according to the loop parameter DL1. The discharging current source ICS2 is coupled across the slope producing capacitor CAP through a third switch S3. When the third switch S3 is configured to be off, the charging current source ICS is configured to charge the slope producing capacitor CAP with the charging current Is1, and the slope compensation signal VSLOPE is configured to increase gradually, wherein the slope of the slope compensation signal VSLOPE is configured to be decided by the loop parameter DL1 and the loop parameter DL2. When the third switch S3 is configured to be on, the discharging current source ICS2 is configured to discharge the slope producing capacitor CAP. In one embodiment, the slope compensation unit 255 is configured to control the third switch S3 to be turned on or off according to the control signal CTRL. The signal processing circuit 2551 is coupled to a common terminal of the slope producing capacitor CAP and the charging current source ICS to receive the slope compensation signal VSLOPE, and is configured to provide the online loop value DL according to the slope compensation signal VSLOPE. The interactive computing equipment 10 is configured to regulate the loop parameter DL1 and DL2 in real time according to the slope compensation signal VSLOPE. In one embodiment, the online loop value DL is configured to represent the amplitude of the slope compensation signal VSLOPE during one switching period Ts. The signal processing circuit 2551 can e.g. comprise a sample hold circuit and an ADC (Analog-Digital Convert) circuit.

In one embodiment, the slope compensation unit 255 further comprises a voltage correcting unit 2552, a PI (Proportional-Integral) unit 2553 and an arithmetic unit 2554. The voltage correcting unit 2552 is configured to receive a loop parameter DL3 and provide a voltage correcting signal VTRIM according to the loop parameter DL3. In one embodiment, the loop parameter DL3 is configured to be a voltage correcting value configured to control the voltage correcting signal VTRIM. The voltage correcting signal VTRIM e.g. is configured to be equal to the loop parameter DL3. The PI unit 2553 is configured to receive the output voltage feedback signal VFB and the reference signal VREF, and is configured to make a PI calculation for a difference (VREF-VFB) between the reference signal VREF and the voltage feedback signal VFB to get a PI signal VPI. The arithmetic unit 2554 is configured to receive the voltage correcting signal VTRIM and the PI signal VPI, and is configured to provide the bias signal VBI according to a sum (VTRIM+VPI) of the voltage correcting signal VTRIM and the PI signal VPI to correct the output voltage VO.

Figure 5:
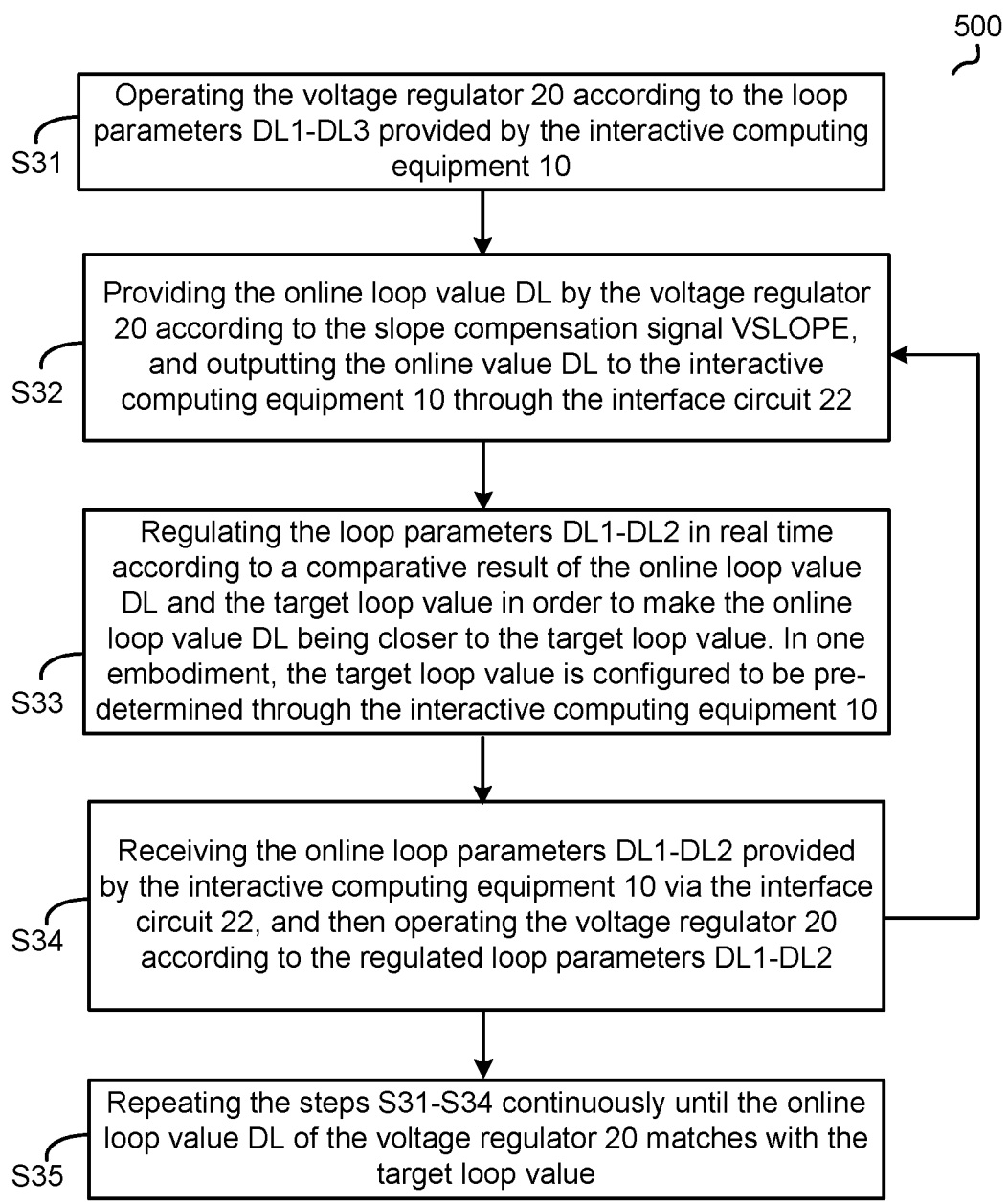
FIG. 5 shows a flow chart 500 of an auto-loop regulation method for an interactive computing equipment according to an embodiment of the present invention.

FIG. 5 shows a flow chart 500 of an auto-loop regulation method for an interactive computing equipment according to an embodiment of the present invention. The flow chart illustrated in FIG. 5 is based on FIG. 1-FIG. 4. The method comprises steps S31-S35.

At the step S31, operating the voltage regulator 20 according to the loop parameters DL1-DL3 provided by the interactive computing equipment 10.

At the step S32, providing the online loop value DL by the voltage regulator 20 according to the slope compensation signal VSLOPE, and outputting the online value DL to the interactive computing equipment 10 through the interface circuit 22.

At the step S33, regulating the loop parameters DL1-DL2 in real time according to a comparative result of the online loop value DL and the target loop value in order to make the online loop value DL being closer to the target loop value. In one embodiment, the target loop value is configured to be pre-determined through the interactive computing equipment 10.

At the step S34, receiving the online loop parameters DL1-DL2 provided by the interactive computing equipment 10 via the interface circuit 22, and then operating the voltage regulator 20 according to the regulated loop parameters DL1-DL2.

At the step S35, repeating the steps S31-S34 continuously until the online loop value DL of the voltage regulator 20 matches with the target loop value.

Figure 6:
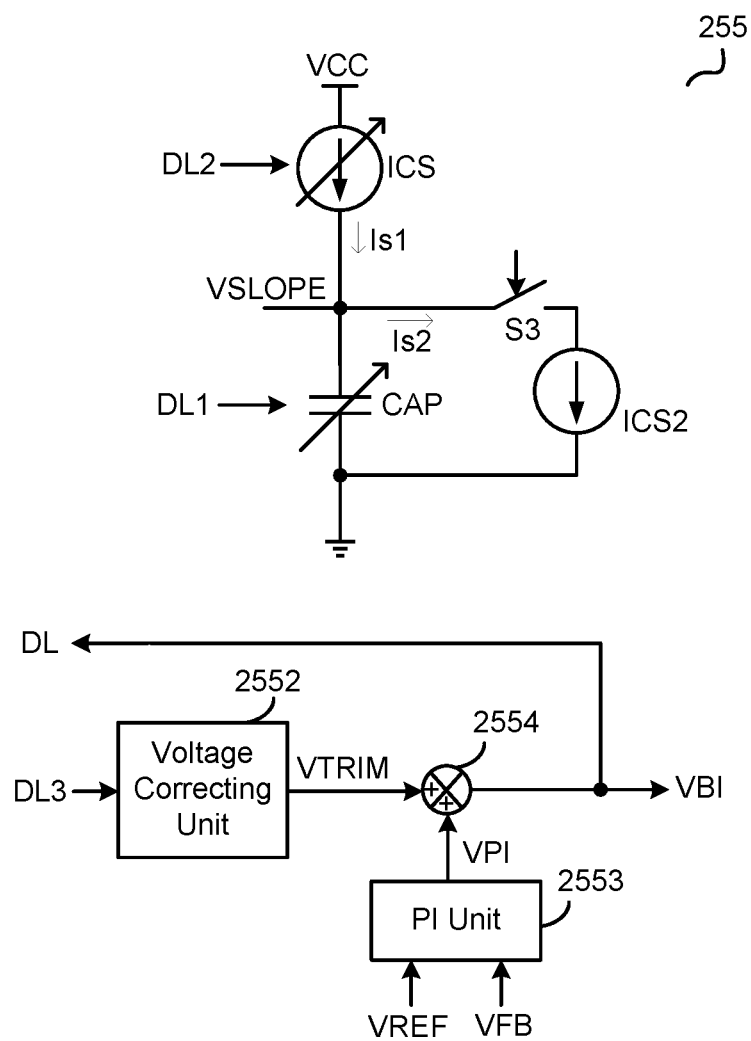
FIG. 6 schematically illustrates a slope compensation unit 255 according to another embodiment of the present invention.

FIG. 6 schematically illustrates a slope compensation unit 255 according to another embodiment of the present invention. In the embodiment illustrated in FIG. 6, the slope compensation unit 255 is configured to provide the online loop value DL according to the bias signal VBI. In one embodiment, the online loop value DL comprises the bias signal VBI which is produced according to the loop parameter DL3 when the voltage regulator 20 is operating online. In one embodiment, the interactive computing equipment 10 is configured to regulate the loop parameter DL3 in real time according to the bias signal VBI, e.g. is configured to regulate the loop parameter DL3 to make it equal to the present online loop value DL. The voltage regulator 20 is configured to further regulate the voltage correcting signal VTRIM according to the regulated loop parameter DL3. The voltage regulator 20 is configured to continue regulating the loop parameter DL3 until the online loop value DL is equal to the voltage correcting signal VTRIM, i.e. until a static error of the voltage feedback signal VFB and the reference voltage VREF is configured to be zero. In the embodiment illustrated in FIG. 6, the target loop value is configured to be the voltage correcting signal VTRIM. In the embodiment illustrated in FIG. 6, a fast correction of the output voltage VO can be realized by optimizing the loop parameter DL3 when the voltage regulator 20 is operating online.

Figure 7:
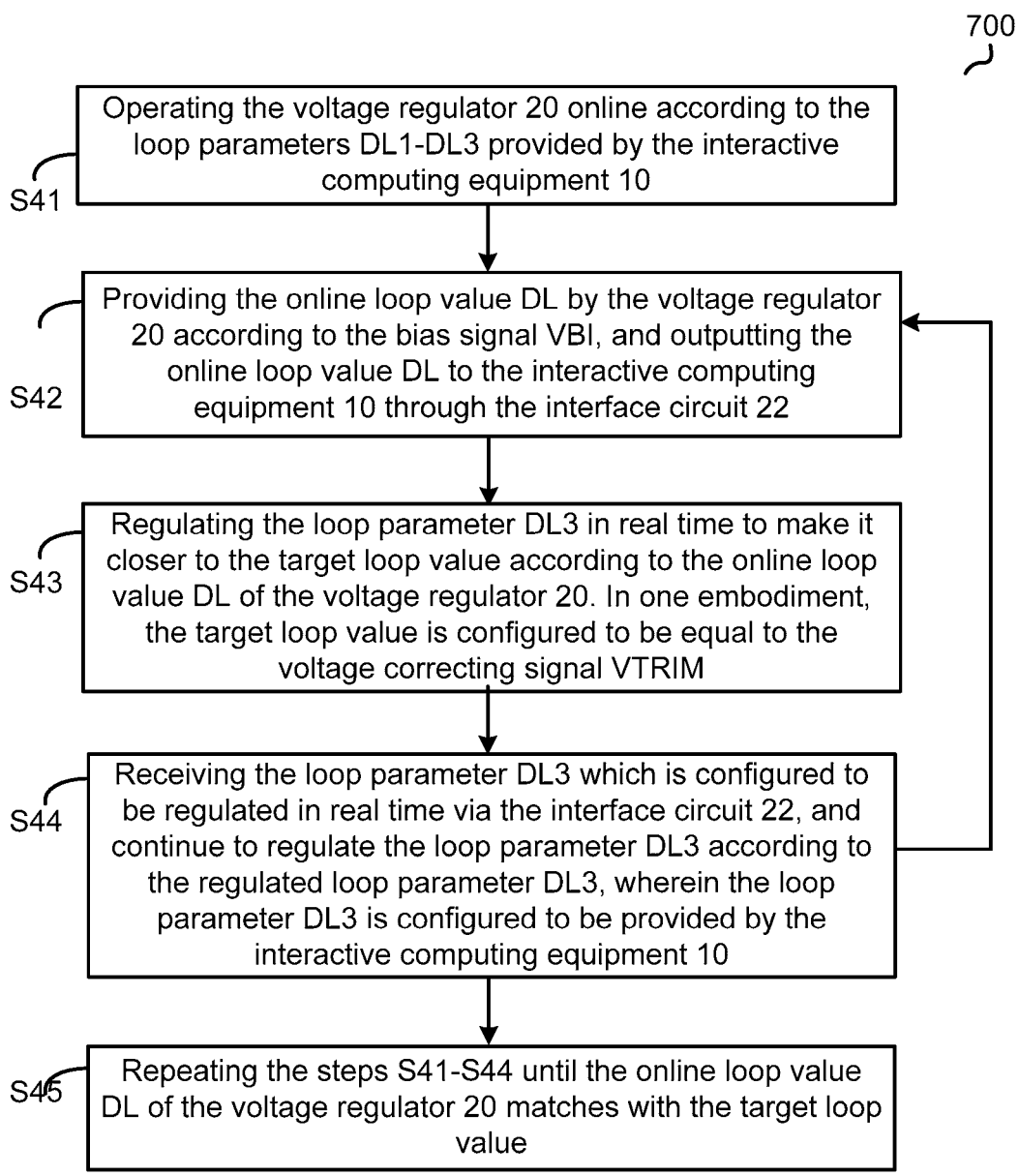
FIG. 7 shows a flow chart 700 of an auto-loop regulation method for an interactive computing equipment according to another embodiment of the present invention.

FIG. 7 shows a flow chart 700 of an auto-loop regulation method for an interactive computing equipment according to another embodiment of the present invention. The flow chart illustrated in FIG. 7 is based on the FIG. 1-FIG. 3 and FIG. 6. The method comprises steps S41-S45.

At the step S41, operating the voltage regulator 20 online according to the loop parameters DL1-DL3 provided by the interactive computing equipment 10.

At the step S42, providing the online loop value DL by the voltage regulator 20 according to the bias signal VBI, and outputting the online loop value DL to the interactive computing equipment 10 through the interface circuit 22.

At the step S43, regulating the loop parameter DL3 in real time to make it closer to the target loop value according to the online loop value DL of the voltage regulator 20. In one embodiment, the target loop value is configured to be equal to the voltage correcting signal VTRIM.

At the step S44, receiving the loop parameter DL3 which is configured to be regulated in real time via the interface circuit 22, and continue to regulate the loop parameter DL3 according to the regulated loop parameter DL3, wherein the loop parameter DL3 is configured to be provided by the interactive computing equipment 10.

At the step S45, repeating the steps S41-S44 until the online loop value DL of the voltage regulator 20 matches with the target loop value.

Figure 8:
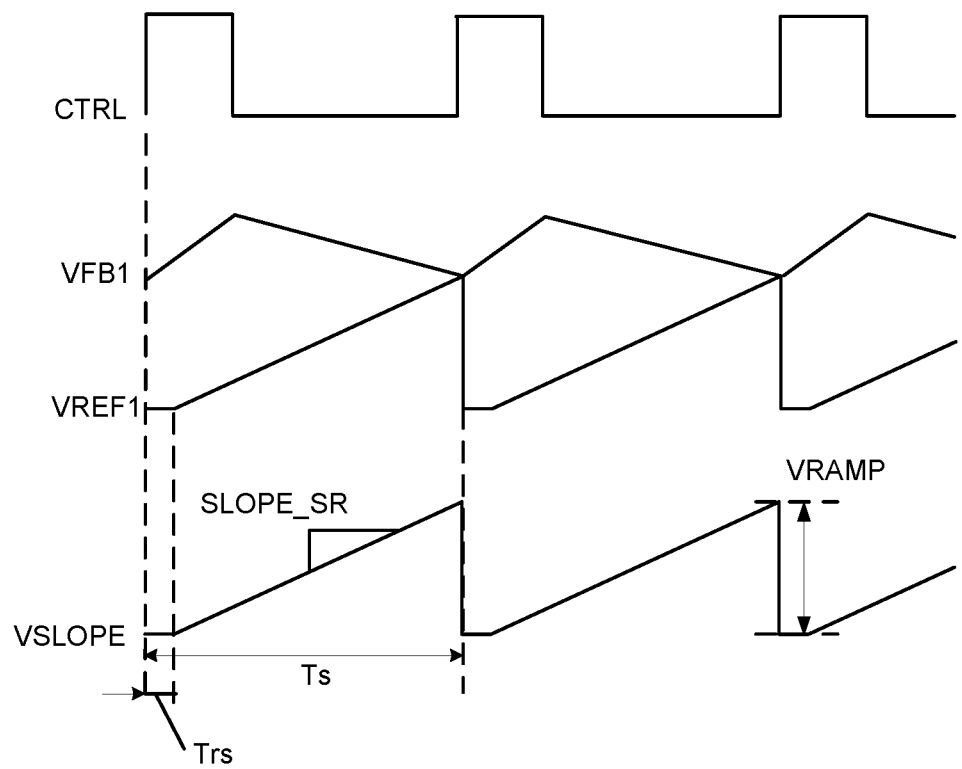
FIG. 8 shows waveforms of the circuit block 300 illustrated in FIG. 3 according to an embodiment of the present invention.

FIG. 8 shows waveforms of the circuit block 300 illustrated in FIG. 3 according to an embodiment of the present invention. As shown in FIG. 8, if a corrected feedback signal VFB1 is less than a corrected reference signal VREF1, the control signal CTRL is configured to control the first switch S1 to be turned on. Meanwhile, the third switch S3 is configured to be turned on, the discharging current source ICS2 is configured to discharge the slope producing capacitor CAP, and the slope compensation signal VSLOPE is configured to be reset to a minimum value. After a time of compensation reset duration Trs, the third switch S3 is configured to be turned off, the charging current source is configured to charge the slope producing capacitor CAP, and the slope compensation signal VSLOPE is configured to increase with a slope SLOP_SR until the corrected feedback signal VFB1 is less than the corrected reference signal VREF1. In one embodiment, the compensation reset duration Trs can be pre-determined via the interactive computing equipment 10. An amplitude VRAMP of the slope signal VSLOPE e.g. can be obtained by formula (1):

$$VRAMP=(Ts-Trs)*SLOPE\_SR$$

In one embodiment, the slope compensation unit 255 is configured to obtain the online loop value DL according to the amplitude VRAMP of the slope signal VSLOPE. The interactive computing equipment 10 is configured to regulate the loop parameters DL1 and DL2 in real time according to a comparison result of the online loop value DL and the target loop value in order to realize a real-time regulation of the slope SLOPE_SR, and the interactive computing equipment 10 is configured to regulate the slope signal VSLOPE and its amplitude VRAMP until the online loop value DL matches with the target loop value.

In one embodiment, the slope compensation unit 255 is configured to obtain the online loop value DL according to the bias signal VBI. The interactive computing equipment 10 is configured to regulate the loop parameter DL3 in real time according to the online value DL in order to realize a real-time regulation of the voltage correcting signal VTRIM.

Figure 9:
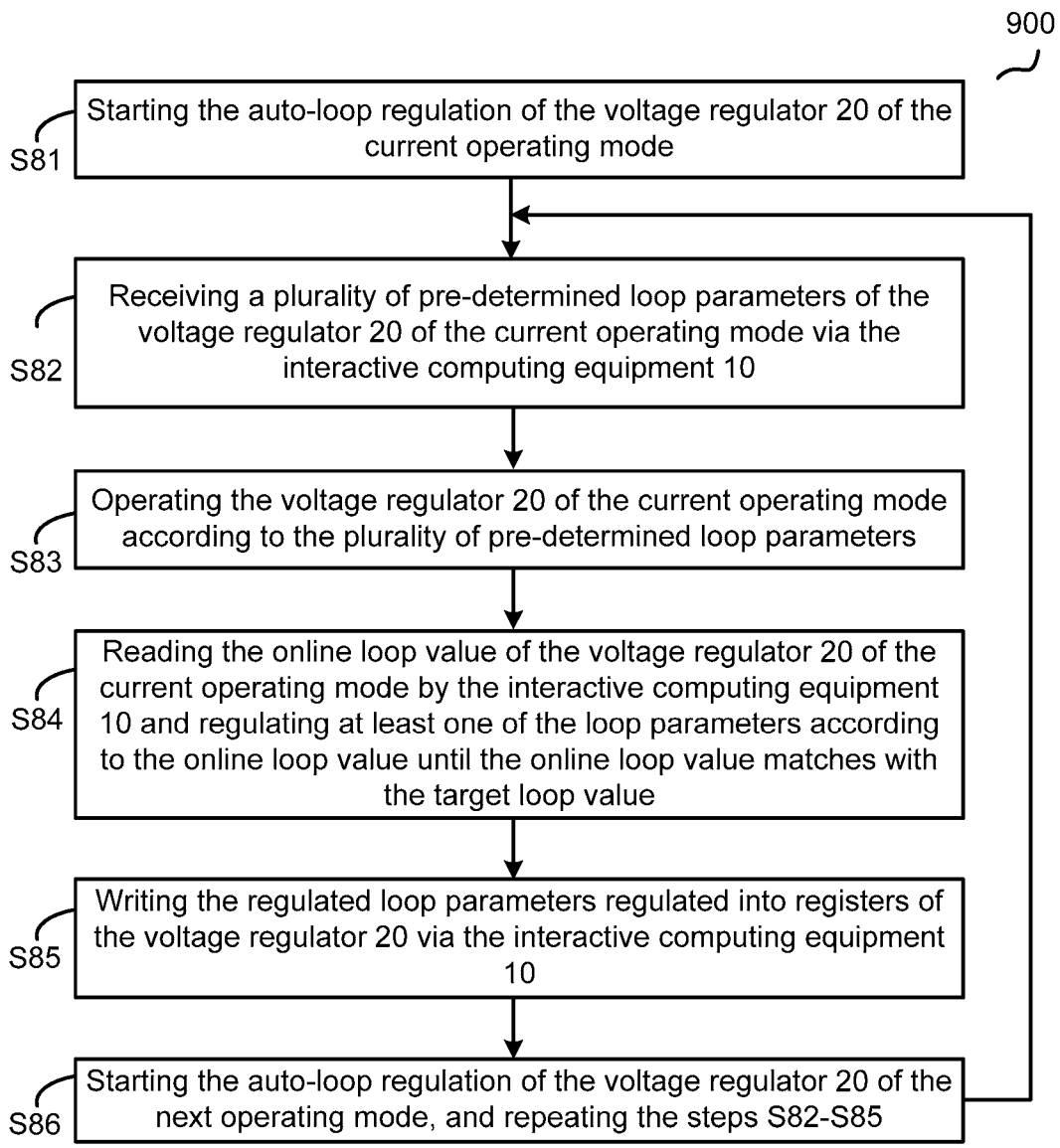
FIG. 9 shows a flow chart 900 of an auto-loop regulation method according to another embodiment of the present invention.

FIG. 9 shows a flow chart 900 of an auto-loop regulation method according to another embodiment of the present invention. In one embodiment, the auto-loop regulation method for the voltage regulator 20 further comprises regulating the loop parameters automatically of each operating mode of the voltage regulator 20 respectively in turn, wherein the voltage regulator 20 comprises a plurality of operating modes. The method illustrated in FIG. 9 comprises steps S81-S86.

At the step S81, starting the auto-loop regulation of the voltage regulator 20 of the current operating mode.

At the step S82, receiving a plurality of pre-determined loop parameters of the voltage regulator 20 of the current operating mode via the interactive computing equipment 10.

At the step S83, operating the voltage regulator 20 of the current operating mode according to the plurality of pre-determined loop parameters.

At the step S84, reading the online loop value of the voltage regulator 20 of the current operating mode by the interactive computing equipment 10 and regulating at least one of the loop parameters according to the online loop value until the online loop value matches with the target loop value.

At the step S85, writing the regulated loop parameters regulated into a memory of the voltage regulator 20 via the interactive computing equipment 10.

At the step S86, starting the auto-loop regulation of the next operating mode, and repeating the steps S82-S85.

In one embodiment, the voltage regulator 20 comprises a multi-phase switching circuit, and the voltage regulator 20 can e.g. operate with an added phase or a reduced phase to satisfy requirements of its load. The plurality of operating modes of the voltage regulator 20 e.g. comprise: one-phase operating, two-phase operating, three-phase operating, four-phase operating and so on. The loop parameters of the voltage regulator 20 of each operating mode is configured to be regulated according to the method illustrated in FIG. 9, and the regulated loop parameters are configured to be written into the memory of the voltage regulator 20.

Note that in the flow chart described above, the box functions may also be implemented with different orders as shown in FIG. 9. For example, two successive box functions may be executed meanwhile, or sometimes the box functions may be executed in reverse order.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. An auto-loop regulation method for a voltage regulator, comprising:
   step a: receiving a plurality of pre-determined loop parameters which are used for the voltage regulator via an interactive computing equipment;
   step b: operating the voltage regulator according to the plurality of pre-determined loop parameters;
   step c: reading an online loop value of the voltage regulator through the interactive computing equipment when the voltage regulator is operating online;

step d: regulating at least one of the loop parameters in real time automatically according to the online loop value of the voltage regulator;

step e: operating the voltage regulator according to regulated loop parameters; and step f: repeating the step c, the step d and the step e until the online loop value of the voltage regulator matches with a target loop value; wherein the voltage regulator is configured to provide a slope compensation signal according to the plurality of loop parameters, and when the interactive computing equipment is regulating at least one of the loop parameters, the slope compensation signal is configured to be adjusted therewith.

2. The auto-loop regulation method for the voltage regulator of claim 1, wherein regulating at least one of the loop parameters in real time automatically according to the online loop value of the voltage regulator further comprises: regulating at least one of the loop parameters by the interactive computing equipment according to a comparison result of the online loop value and the target loop value, wherein the target loop value is configured to be pre-determined.

3. The auto-loop regulation method for the voltage regulator of claim 2, wherein the online loop value comprises: an amplitude of the slope compensation signal, configured to be produced according to the loop parameters when the voltage regulator is operating online.

4. The auto-loop regulation method for the voltage regulator of claim 1, wherein the pre-determined loop parameters comprise:

a slope producing capacitor value, configured to regulate a capacitance of a slope producing capacitor in the voltage regulator; and a charging current value, configured to regulate a current provided by a charging current source in the voltage regulator, wherein the charging current source is configured to charge the slope producing capacitor.

5. The auto-loop regulation method for the voltage regulator of claim 1, further comprising: writing the regulated loop parameters into a memory of the voltage regulator via the interactive computing equipment.

6. The auto-loop regulation method for the voltage regulator of claim 1, further comprising:

automatically regulating the loop parameters of each operating mode of the voltage regulator in turn via the interactive computing equipment, wherein the voltage regulator comprises a plurality of operating modes.

7. The auto-loop regulation method for the voltage regulator of claim 6, further comprising:

regulating at least one of the loop parameters of the current operating mode automatically in real time according to the online loop value of the current operating mode via the interactive computing equipment;

writing the loop parameters of the current operating mode into a memory of the voltage regulator; and starting an auto-loop regulation of next operating mode.

8. An auto-loop regulation system for a voltage regulator, wherein the voltage regulator is configured to receive an input voltage and provide an output voltage, comprising:

an interactive computing equipment, configured to receive a plurality of pre-determined loop parameters which are used for the voltage regulator, and the interactive computing equipment is configured to regulate at least one of the loop parameters in real time automatically according to an online loop value of the voltage regulator when the voltage regulator is operating online; and a communication bus, coupled between the interactive computing equipment and the voltage regulator, and is configured to realize a real-time communication between the interactive computing equipment and the voltage regulator; wherein the voltage regulator is configured to provide a slope compensation signal according to the plurality of loop parameters, and when the interactive computing equipment is regulating at least one of the loop parameters, the slope compensation signal is configured to be adjusted therewith.

9. The auto-loop regulation system for the voltage regulator of claim 8, wherein the interactive computing equipment is configured to read the online loop value of the voltage regulator via the communication bus and regulate at least one of the loop parameters automatically in real time until the online loop value of the voltage regulator matches with a target loop value.

10. The auto-loop regulation system for the voltage regulator of claim 8, wherein the interactive computing equipment further comprises:

an input equipment, configured to receive user preferences;

a GUI (Graphical User Interface), configured to provide a user interface in a visual way;

a processing unit, configured to carry out preset computer readable program codes and regulate at least one of the loop parameters in real time according to the online loop value of the voltage regulator; and an input and output bus interface, coupled to the voltage regulator through the communication bus.

11. The auto-loop regulation system for the voltage regulator of claim 8, wherein the voltage regulator further comprises:

an interface circuit, coupled to the interactive computing equipment through the communication bus;

a memory, configured to store the loop parameters provided by the interactive computing equipment;

a voltage regulation circuit, configured to receive the input voltage and provide a regulated output voltage; and a control loop, configured to control the voltage regulation circuit to operate according to the loop parameters stored in the memory or the loop parameters provided by the interactive computing equipment.

12. The auto-loop regulation system for the voltage regulator of claim 11, wherein the control loop further comprises:

a slope producing capacitor, configured to produce the slope compensation signal; and a charging current source, configured to produce a charging current which is used to charge the slope producing capacitor; wherein the plurality of loop parameters comprise a first loop parameter and a second loop parameter, wherein the first loop parameter is configured to control the slope producing capacitor, the second loop parameter is configured to control the charging current source, and the interactive computing equipment is configured to regulate the first loop parameter and the second loop parameter in real time according to the slope compensation signal.

13. An auto-loop regulation system for the voltage regulator of claim 11, wherein the control loop further comprises:

a voltage correcting unit, configured to provide a voltage correcting signal;

a PI (Proportional-Integral) unit, configured to provide a PI signal according to a difference between an output voltage feedback signal and a reference voltage; and an arithmetic unit, configured to provide a bias signal according to the voltage correcting signal and the PI signal, wherein the bias signal is configured to correct the output voltage; wherein the plurality of loop parameters comprise a third loop parameter which is configured to control the voltage correcting signal, and the interactive computing equipment is configured to regulate the third loop parameter according to the bias signal.

14. The auto-loop regulation system for the voltage regulator of claim 8, the interactive computing equipment is configured to automatically regulate the loop parameters of each operating mode of the voltage regulator respectively, wherein the voltage regulator comprises a plurality of operating modes.

15. A voltage regulator, comprising:

an interface circuit, coupled to an interactive computing equipment through a communication bus;

a memory, configured to store a plurality of loop parameters provided by the interactive computing equipment;

a voltage regulation circuit, configured to receive an input voltage and provide a regulated output voltage; and a control loop, configured to receive the plurality of loop parameters provided by the interactive computing equipment, and according to the plurality of loop parameters, the control loop is configured to control the voltage regulator to operate online, and when the voltage regulator is operating online, the control loop is configured to provide an online loop value of the voltage regulator; wherein the voltage regulator is configured to output the online loop value to the interactive computing equipment by the interface circuit, and the interactive computing equipment is configured to keep regulating the loop parameters according to the online loop value in real time until the online loop value matches with a target loop value, and the voltage regulator is configured to provide a slope compensation signal according to the plurality of loop parameters, and when the interactive computing equipment is regulating the loop parameters, the slope compensation signal is configured to be adjusted therewith.

16. The voltage regulator of claim 15, wherein the control loop further comprises:

a slope producing capacitor, configured to produce the slope compensation signal; and a charging current source, configured to provide a charging current which is used to charge the slope producing capacitor; wherein the plurality of loop parameters comprise a first loop parameter and a second loop parameter, wherein the first loop parameter is configured to control the slope producing capacitor, the second loop parameter is configured to control the charging current source, and the interactive computing equipment is configured to regulate the first loop parameter and the second loop parameter in real time according to the slope compensation signal.

17. The voltage regulator of claim 15, wherein the control loop further comprises:

a voltage correcting unit, configured to provide a voltage correcting signal;

a PI (Proportional-Integral) unit, configured to provide a PI signal according to a difference between an output voltage feedback signal and a reference voltage; and an arithmetic unit, configured to provide a bias signal according to the voltage correcting signal and the PI signal, wherein the bias signal is configured to correct the output voltage; wherein the plurality of loop parameters comprise a third loop parameter configured to control the voltage correcting signal, and the interactive computing equipment is configured to regulate the third loop parameter in real time according to the bias signal.

* * * * *